United States Patent [19]

Boser et al.

[11] Patent Number: 5,412,565
[45] Date of Patent: * May 2, 1995

[54] ELECTRONIC SYNAPSE CIRCUIT FOR ARTIFICIAL NEURAL NETWORK

[75] Inventors: Bernhard Boser, Locust; Eduard Säckinger, Tinton Falls, both of N.J.

[73] Assignee: AT&T Corp., Murray Hill, N.J.

[ * ] Notice: The portion of the term of this patent subsequent to Dec. 28, 2010 has been disclaimed.

[21] Appl. No.: 88,992

[22] Filed: Jul. 7, 1993

Related U.S. Application Data

[63] Continuation of Ser. No. 815,099, Dec. 27, 1991, Pat. No. 5,274,748.

[51] Int. Cl.⁶ .......................... G06J 1/00; G06F 15/18
[52] U.S. Cl. ....................................... 364/600; 395/27
[58] Field of Search ............... 364/606; 341/144, 150; 395/27

[56] References Cited

U.S. PATENT DOCUMENTS

| | | | |
|---|---|---|---|
| 3,651,517 | 3/1972 | Kurek et al. | 340/347 |
| 4,126,852 | 11/1978 | Baertsch | 364/606 X |
| 4,262,336 | 4/1981 | Pritchard | 364/474 |
| 4,308,467 | 12/1981 | Kolluri et al. | 307/304 |
| 4,320,391 | 3/1982 | Mallett | 364/606 X |
| 4,425,483 | 1/1984 | Lee et al. | 379/411 |
| 4,460,970 | 7/1984 | McClary | 364/761 |
| 4,461,986 | 7/1984 | Maynard et al. | 318/778 |
| 4,644,193 | 2/1987 | Ott | 307/264 X |
| 4,654,815 | 3/1987 | Marin et al. | 364/604 X |
| 4,779,029 | 10/1988 | Henderson et al. | 341/144 X |
| 4,926,360 | 5/1990 | Spink, Jr. | 364/550 X |
| 4,931,674 | 6/1990 | Kub et al. | 307/529 |
| 4,990,916 | 2/1991 | Wynne et al. | 341/147 |
| 5,039,871 | 5/1992 | Engeler | 307/201 |
| 5,131,072 | 7/1992 | Yoshizawa et al. | 395/24 |
| 5,136,177 | 8/1992 | Castro | 307/201 |

OTHER PUBLICATIONS

J. A. Schoeff, *IEEE J. Solid-State Circuits*, vol. SC-13, No. 6, Dec. 1978, "A Microprocessor-Compatible High-Speed . . . ," pp. 746-753.
S. Satyanarayana et al., *Adv. in Neural Inf. Proc. Systems 2*, Morgan Kaufmann Publishers, 1990, "A Reconfigurable Analog VLSI Neural . . . ," pp. 758-768.
A. Moopenn et al., *Adv. in Neural Inf. Proc. Systems 2*, Morgan Kaufmann Publ., "Digital-Analog Hybrid Synapse . . . ," pp. 769-776, 1990.
B. Boser et al., *ISSCC91 Dig. of Tech. Papers*, vol. 34, Paper TP11.3, Feb. 1991 "An Analog Neural Network Processor with . . . ".
A. M. Chiang et al., *IEEE J. Solid-State Circuits*, vol. 26, No. 12, Dec. 1991, "A CCD Programmable Image Processor and . . . ," pp. 1894-1901.

*Primary Examiner*—Tan V. Mai
*Attorney, Agent, or Firm*—Gregory C. Ranieri

[57] ABSTRACT

An electronic synapse circuit is disclosed for multiplying an analog weight signal value by a digital state signal value to achieve a signed product value as a current which is capable of being summed with other such synapse circuit outputs. The circuit employs a storage multiplying digital-to-analog converter which provides storage for the analog weight signal value. Additional circuitry permits programming different analog weight signal values into the circuit, performing four-quadrant multiplication, generating a current summable output, and maintaining the stored analog weight signal value at a substantially constant value independent of the digital state signal values.

13 Claims, 1 Drawing Sheet

ELECTRONIC SYNAPSE CIRCUIT FOR ARTIFICIAL NEURAL NETWORK

This is a continuation of application Ser. No. 07/815,099, filed Dec. 27, 1991, U.S. Pat. No. 5,274,748.

TECHNICAL FIELD

This invention relates to electronic circuits and, more particularly, to circuits for multiplying values of separate input signals such as in electronic synapse circuits.

BACKGROUND OF THE INVENTION

Hardware realizations of neural networks cover a wide spectrum of electronic circuits from digital emulators to fully analog networks. The so-called neural networks are based on parallel computing architectures which emulate neural functions such as pattern recognition and character recognition.

Digital implementations of neural networks provide a more flexible framework than analog circuits for achieving computational accuracy with arbitrary precision. On the other hand, analog circuits theoretically permit a much higher density of connections per chip than the corresponding digital circuits. An analog implementation has been described in U.S. patent application Ser. No. 654,998 (H. P. Graf Case 7). Even hybrid implementations have appeared recently in which a mixture of analog and digital circuitry is employed to realize the neural network.

The neural network includes a plurality of computational elements or neurons each of which perform a variety of mathematical functions on the input signals, images, or other stimuli being processed by the neural network. Each neuron comprises a plurality of synapse circuits in which an input is multiplied by a particular weight. The weighted inputs from the synapse circuits are summed together in the neuron and are processed by a nonlinear squashing function to produce a neuron output. An example of a neuron or computational element has been shown and described in U.S. Pat. No. 5,067,164.

Recent realizations of neuron synapse circuits have appeared in hybrid form wherein digital weights are multiplied by analog input signals using multiplying digital-to-analog converters. The digital weight is converted to analog form and multiplies the analog input signal to produce the analog synapse output. For example, two quadrant multiplication of a digital weight and an analog input is described in *Neural Information Processing Systems* 2, pp. 769 et seq. (D. S. Touretzky ed. 1990) whereas four quadrant multiplication of the same signals is described in *IEEE. J. Solid-State Circuits*, Vol. 26, No. 12, pp. 1894–1901 (December 1991).

For these realizations, digital weights are stored in cyclic shift registers or dedicated latch circuits and the analog input signals are supplied to the multiplying digital-to-analog converter. The motivation for this approach is apparently two-fold. First, digital storage is relatively inexpensive. Second, since the weights remain constant for a particular neuron while the input signals are changing during operation of the neuron, the weights are transformed into digital form for storage in the digital memory or registers associated with the multiplying digital-to-analog converter in the neuron. This approach requires separate digital storage for each weight in conjunction with the multiplying circuit for each synapse circuit.

SUMMARY OF THE INVENTION

Dedicated memories and shift register type storage elements are eliminated in a hybrid electronic synapse circuit which is realized for multiplying an analog weight signal value by a digital state signal value to achieve a signed product value as a current which is capable of being summed with other such synapse circuit outputs. The circuit employs a storage multiplying digital-to-analog converter which provides storage for the analog weight signal value. Storage of the analog weight signal value is accomplished using the same circuit elements which are employed in the multiplication circuit In a specific embodiment, additional circuitry permits programming different analog weight signal values into the circuit, performing four-quadrant multiplication, generating a current summable output, and maintaining the stored analog weight signal value at a substantially constant value independent of the digital state signal values.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Figure 1:
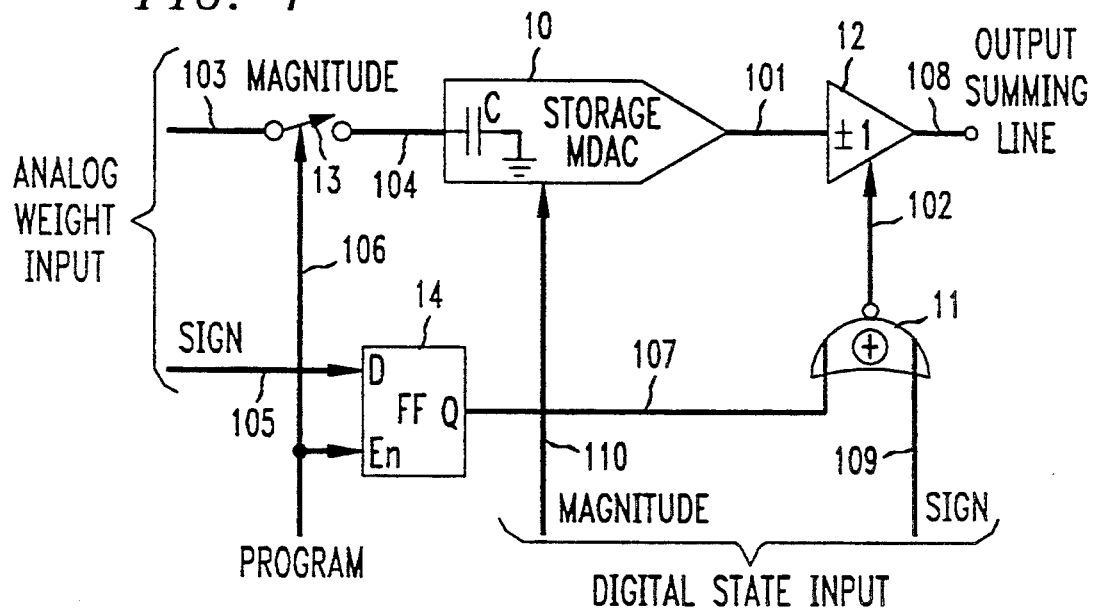
FIG. 1 shows a block diagram of an electronic synapse circuit realized in accordance with the principles of the present invention.

FIG. 1 shows a simplified block diagram schematic drawing of an electronic synapse circuit. The circuit includes ports for input signals, one analog and the other digital, multiplying digital-to-analog converter 10, exclusive-OR gate 11, controlled current inverter 12, and flip-flop 14.

Inputs to the synapse circuit are an analog weight input and a digital state input. Each input comprises a magnitude and a sign which together form the signal value. Magnitudes of the inputs are multiplied in storage multiplying digital-to-analog converter 10 to produce an output signal on lead 101 representing the product of the magnitudes of the analog weight and digital state magnitude inputs. The digital state input is supplied via lead 110 while the analog weight from lead 104 is stored within storage multiplying digital-to-analog converter 10.

The electronic synapse circuit of FIG. 1 is said to be capable of four-quadrant multiplication. Since the inputs to the synapse circuit include signs, it is possible to obtain a sign for the product. The sign is determined for the product of the magnitudes by using exclusive-OR gate 11. Exclusive-OR gate 11 logically combines the sign of the analog weight input on lead 107 with the sign of the digital state input on lead 109 to produce an output on lead 102 representing the product of both signs. When both signs are the same, the output on lead 102 is in one state signifying a positive signed product. When both signs are opposite, the output on lead 102 is in an opposite state indicative of a negative signed product.

The output of exclusive OR gate 11 is applied to controlled current inverter 12 to control the polarity of the output of the product from multiplying digital-to-analog converter 10. When the output from exclusive- OR 11 signifies a positive signed output, the product of the magnitudes is passed through to lead 108. When the output from exclusive-OR 11 signifies a negative signed output, the product of the magnitudes is inverted by the controlled current inverter and output to lead 108. By providing an output current from inverter 12, each synapse circuit can be easily connected at the outputs for current summing.

Programmability is afforded by the electronic synapse circuit in FIG. 1. In particular, a program signal on lead 106 is applied to switch 13 and to flip-flop 14 via the enable (En) input. When the program signal is applied, switch 13 closes to allow the magnitude portion of the analog weight input on input lead 103 to be transferred to multiplying digital-to-analog converter 10 via lead 104 for storage therein. Similarly, the program signal allows the sign portion of analog weight input on lead 105 to be transferred from the D input to the Q output of flip-flop 14 for storage therein. The Q output of flip-flop 14 is connected to an input of exclusive OR gate 11 via lead 107. When the program signal ceases, the new analog weight input is stored in the synapse circuit Multiplying digital-to-analog converter 10 provides storage capability for the magnitude portion of the analog weight input Hence, this element is more appropriately called storage multiplying digital-to-analog converter 10. The capacitor C shown in the symbolic representation for the element is intended to convey the addition of an analog storage capability to the multiplying digital-to-analog converter. Details about the means by which the analog weight is stored are provided herein, particularly, with reference to the embodiment shown in FIG. 2.

Figure 2:
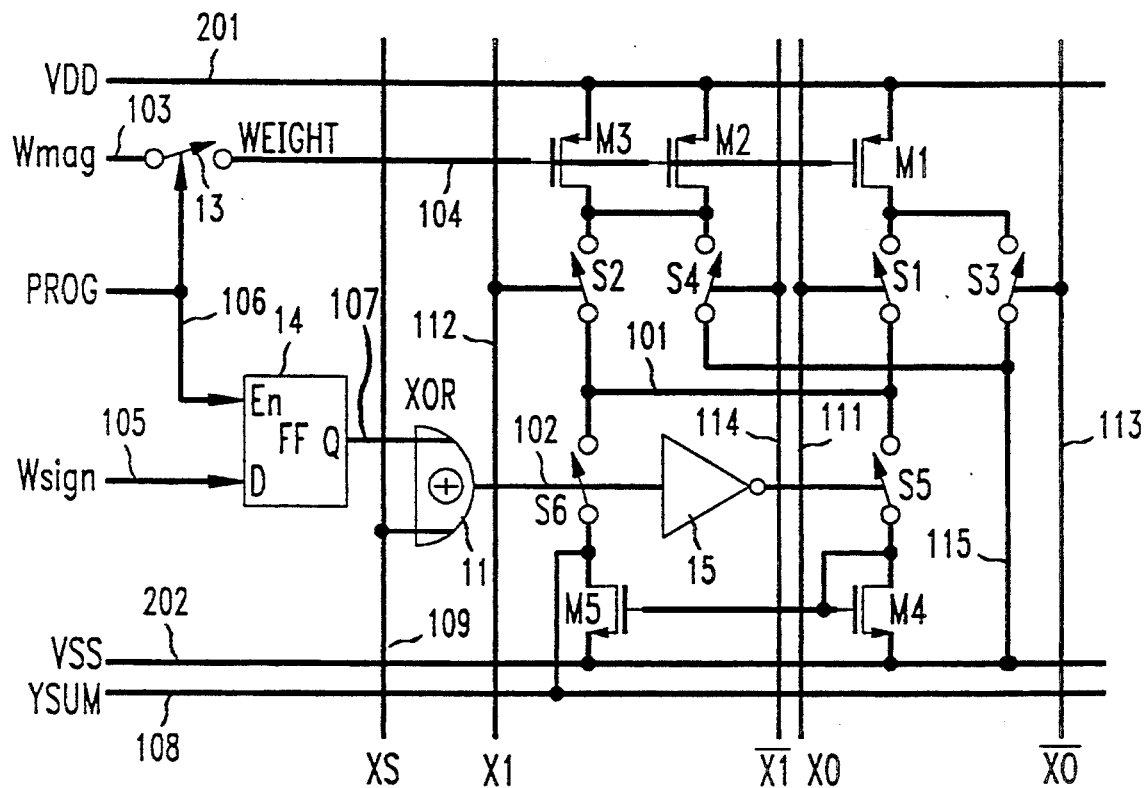
FIG. 2 shows a detailed schematic drawing of the circuit in FIG. 1.

FIG. 2 shows a more detailed schematic diagram of the electronic synapse circuit from FIG. 1. Elements and leads bearing the identical reference numerals to elements and leads in FIG. I are considered to be substantially identical.

Source voltage VDD is applied to the electronic synapse circuit via lead 201. Ground potential VSS is shown on lead 202. Output of the circuit is shown as summing lead YSUM.

The analog weight signal comprises a magnitude portion Wmag and a sign portion Wsign. Programming of a particular analog weight into the electronic synapse circuit is accomplished by applying a programming signal PROG to the circuit. Specifically, signal PROG on lead 106 activates closure of switch 13 and enablement of flip-flop 14. As a result, the analog weight magnitude Wmag is transferred from lead 103 through switch 13 to lead 104; also, the analog weight sign Wsign is transferred from lead 105 through the D input of the flip-flip so that the analog weight sign becomes stored in the flip-flop and appears at the Q output thereof. Lead 104 is connected to gates of the PMOS transistors M1, M2, and M3 through which multiplication of the weight and state signal values is accomplished. Lead 107 couples the Q output of the flip-flop 14 to exclusive-OR gate (XOR) 11.

Storage multiplying digital-to-analog converter 10 comprises transistors M1, M2, and M3 together with switches S1, S2, S3, and S4. This portion of the electronic synapse circuit computes the product of the magnitudes of the analog weight and the digital state signals.

As shown in FIG. 2, the digital state signal comprises a three-bit representation wherein XS is the sign bit on lead 109, X0 is the least significant magnitude bit on lead 111, and X1 is the most significant magnitude bit on lead 112. Inverted magnitude bits are shown as the inverted least significant bit $\overline{X0}$ on lead 113 and the inverted most significant bit $\overline{X1}$ on lead 114. The magnitude bits control the operation of switches S1 and S2 while the inverted magnitude bits control the operation of switches S3 and S4. When a logical "1" is applied to a switch by the digital state magnitude bits, the switch assumes a closed position; when a logical "0" is applied to a switch, the switch assumes an open position. Switches S1 and S2 are utilized in the digital-to-analog conversion and multiplication portions of storage multiplying digital-to-analog converter 10. Switches S3 and S4 are utilized in the storage portion of storage multiplying digital-to-analog converter 10.

Transistors M1, M2, and M3 have their sources connected to VDD while their gates are connected in common to lead 104 to receive the analog weight magnitude Wmag. The drains of transistors M2 and M3 are connected together. Transistor M1 drain is connected to the upper contact of each of switches S1 and S3. Transistor M2 drain is connected to the upper contact of switch S4 while transistor M3 drain is connected to the upper contact of switch S2. The lower contacts of switches S1 and S2 are coupled as the output lead 101 for the storage multiplying digital-to-analog converter. In a similar manner, the lower contacts of switches S3 and S4 are coupled together at VSS.

After application of the signal PROG, a charge packet corresponding to the value Wmag is stored on the gate-source capacitors of transistors M1–M3. These transistors are then able to supply substantially equal currents proportional to the stored weight Wmag. By combining the drains of M2 and M3, a current proportional to twice the stored magnitude Wmag is formed. The product of the analog weight with the digital state is then achieved as follows: a digital state value "0" causes switches S1 and S2 to remain open with no current supplied to lead 101; a digital state value "1" causes switch S1 to be closed while S2 remains open with a current proportional to one times the stored analog weight magnitude (1×Wmag) supplied to lead 101; a digital state value "2" causes switch S1 to remain open while S2 is closed with a current proportional to two times the stored analog weight magnitude (2×Wmag) supplied to lead 101; and a digital state value "3" causes switches S1 and S2 to be closed with a current proportional to three times the stored analog weight magnitude (3×Wmag) supplied to lead 101.

Drain currents from the transistors M1–M3 are maintained at a substantially constant level regardless of the digital state bit values by operating the transistors M1–M3 in a saturated mode. This is accomplished by switches S3 and S4 which are controlled by the inverted digital state bits $\overline{X0}$ and $\overline{X1}$, respectively. Switches S3 and S4 are employed to connect the drains of the transistors to ground potential VSS. Switch S3 causes the drain of transistor M1 to be connected to ground when the switch is closed. Switch S4 causes the drains of transistors M2 and M3 to be connected to ground when the switch is closed. Closure of switches S3 and S4 permits the gate capacitance to remain constant by dumping unneeded output current to VSS.

As explained herein, the sign of the product of the digital state and the analog weight is computed in exclusive-OR 11 from the sign of the analog weight stored in flip-flop 14 and the digital state sign bit XS on lead 109. Lead 102 carries the exclusive-OR output to the control lead of switch S6 and to the input of logical inverter 15. Logical inverter 15 has its output coupled to the control lead of switch S5. Logical inverter 15 performs a standard logical inversion or NOT function of the input bit.

Switches S5 and S6 have their upper contacts connected to lead 101. When the sign of the product from exclusive-OR gate 11 is positive, switch S6 is closed and switch S5 is open. The current from the storage multiplying digital-to-analog converter on lead 101 is allowed to flow through switch S6 directly to the output current summing line YSUM on lead 108. Since switch S5 is open, no current is allowed to flow through that switch path.

When the sign of the product is negative, switch S6 is open and switch S5 is closed. The current from the storage multiplying digital-to-analog converter on lead 101 is shunted through switch S5 into the drain of NMOS transistor M4 which is shorted to its own gate. NMOS transistors M4 and M5 have their gates connected together, their sources connected together at ground potential VSS, and their drains connected to the lower contacts of switches S5 and S6, respectively. These two transistors form a current mirror which acts as a current source at the output of the electronic synapse circuit. As such, the current flowing through switch S5 is inverted by the current mirror and appears via the drain of transistor M5 on the output current summing line YSUM on lead 108.

Although not shown in the FIGs., the electronic synapse circuit can be connected with other such circuits via output current summing lines YSUM. Since current summing line YSUM accumulates synapse contributions from the other synapse circuits in the neuron, the line YSUM is desirably held at a constant potential such as 1 V by the associated neuron body to ensure proper operation of the storage multiplying digital-to-analog converter and the current mirror. Other more complex current mirrors may be used in place of transistors M4 and M5 without departing from the teachings of the present invention.

The circuit shown in FIG. 2 is designed for a digital signal represented as a signed magnitude having three bits. This is for illustrative purposes only. It will be apparent to persons skilled in the art upon as reading of this specification that embodiments having fewer bits or more bits for the digital signal are realizable without departing from the spirit and scope of this invention.

Switches S1 through S6 are standard NMOS transistors in the description relating to FIG. 2 above. While the detailed schematic circuit drawings of the switches, flip-flop, exclusive-OR gate, and logical inverter have not been presented herein, it is understood that they are well known to persons skilled in the art.

The circuit shown in FIG. 2 is realized with standard complementary metal oxide semiconductor field effect transistors, namely, PMOS and NMOS FETs. Other types of transistor devices are contemplated for substitution in the circuit.

The present invention is equally well suited for application to equalizers, filters, and other signal processing elements in which multiplication of the values of an analog signal and a digital signal is desired. For example, the circuit may be used to form the dot-product or vector-product between two sets of signal values.

It should now be apparent that the electronic synapse circuit shown in FIGS. 1 and 2 exhibits efficiencies over prior an circuits because it utilizes the same sets of transistors to perform the functions of storage, multiplication, and digital-to-analog conversion. No additional internal or external storage elements are needed for this circuit. The need for cyclic shift registers of the prior an circuits is eliminated.

What is claimed is:

1. Apparatus responsive to an analog first signal and a digital second signal, each first and second signal having respective values, the apparatus including a multiplying digital-to-analog converter having a plurality of circuit elements for multiplying first and second signal values to generate a third signal whose value is substantially equal to the analog product of the first and second signal values, the apparatus characterized in that, the multiplying digital-to-analog converter also for storing a new analog value of the analog first signal at a predetermined time, wherein storing is performed by the circuit elements used for multiplying.

2. The apparatus as defined in claim 1 wherein the first and second signal values each have a magnitude portion and a sign portion, the apparatus further comprises means for storing the sign portion of the analog first signal value.

3. The apparatus as defined in claim 2 wherein the means for storing the sign portion includes a flip-flop element jointly responsive to the sign portion of the analog first signal value and a storage control signal.

4. The apparatus as defined in claim 2 further comprising means for multiplying the sign portions of both the analog first signal value and the digital second signal value to generate a sign portion of the third signal value.

5. The apparatus as defined in claim 4 wherein the means for multiplying the sign portions includes an exclusive-OR gate.

6. The apparatus as defined in claim 1 further comprising means responsive to the third signal value for controllably supplying a constant current output proportional to the magnitude portion of the third signal value.

7. The apparatus as defined in claim 6 wherein the means for controllably supplying the constant current further includes means responsive to a sign portion of the third signal value for controllably inverting the constant current output when the sign portion of the third signal value represents a negative sign.

8. The apparatus as defined in claim 7 wherein the means for controllably supplying the constant current includes a current mirror having inverting and non-inverting input terminals and an output terminal, first switching means responsive to the sign portion of the third signal value for connecting the third signal to the non-inverting terminal when the sign portion of the third signal value represents a positive sign, and second switching means responsive to the inversion of the sign portion of the third signal value for connecting the third signal to the inverting terminal when the sign portion of the third signal value represents a negative sign.

9. The apparatus as defined in claim 8 further including means responsive to the sign portion of the third signal for inverting the sign portion of the third signal.

10. The apparatus as defined in claim 1 wherein the means for storing further includes means responsive to the value of the digital second signal for maintaining the stored new value of the analog first signal value at a level proportional thereto.

11. The apparatus as defined in claim 10 wherein the means for maintaining includes means for controllably shunting current away from the storage means in response to the value of the digital second signal.

12. The apparatus as defined in claim 1 wherein the means for storing comprises at least one field effect transistor having a gate terminal responsive to the magnitude portion of the analog first signal value, a source terminal coupled to a reference potential, and a drain terminal for supplying magnitude portion of the third signal value.

13. The apparatus as defined in claim 12 further including switching means for connecting the drain terminal to a second reference potential when the bit value of the digital second signal is a logical zero and the switching means also for connecting the drain terminal to an output of the multiplying digital-to-analog converter means when the bit value of the digital second signal is a logical one.

* * * * *